United States Patent [19]
Nikolai

[11] Patent Number: 5,718,493
[45] Date of Patent: Feb. 17, 1998

[54] CABINET CONSTRUCTION SYSTEM

[76] Inventor: Gerhard Nikolai, #403 - 12 K de K Court, New Westminster, B.C. V3M 6C5, Canada

[21] Appl. No.: 416,374

[22] Filed: Apr. 4, 1995

[51] Int. Cl.[6] ............................................. A47F 5/08
[52] U.S. Cl. ................. 312/245; 403/405.1; 403/407.1; 403/68; 312/348.2; 312/263; 312/265
[58] Field of Search .................. 312/245, 246, 312/247, 348.1, 348.2, 263, 265, 265.5; 211/94, 88; 403/405.1, 406.1, 407.1, 68, 66, 65; 248/225.11, 225.21

[56] References Cited

U.S. PATENT DOCUMENTS

| | | |
|---|---|---|
| 3,784,273 | 1/1974 | Nikolai . |
| 3,835,610 | 9/1974 | Harper et al. ............. 403/406.1 |
| 4,040,151 | 8/1977 | Brimm . |
| 4,099,293 | 7/1978 | Pittasch ................. 403/406.1 X |
| 4,236,848 | 12/1980 | Röck et al. . |
| 4,292,003 | 9/1981 | Pond . |
| 4,634,309 | 1/1987 | Dewey . |
| 4,685,848 | 8/1987 | Langer . |
| 4,869,564 | 9/1989 | Lechman . |
| 4,928,833 | 5/1990 | Huizenga ................ 312/245 X |
| 4,944,627 | 7/1990 | Durney . |
| 4,957,386 | 9/1990 | Harley et al. . |
| 5,050,832 | 9/1991 | Lee et al. ............... 312/245 X |
| 5,138,802 | 8/1992 | Lechner .................. 312/245 |
| 5,222,611 | 6/1993 | Wood et al. ............ 312/245 X |

FOREIGN PATENT DOCUMENTS

| | | | |
|---|---|---|---|
| 2919769 | 11/1980 | Germany ................ 403/405 |
| 1010069 | 11/1965 | United Kingdom ....... 312/263 |

*Primary Examiner*—Peter M. Cuomo
*Assistant Examiner*—Janet M. Wilkins
*Attorney, Agent, or Firm*—Lyon & Lyon LLP

[57] ABSTRACT

A cabinet construction system comprises a rail member mountable to a fixed support surface from which are suspended end panels by mail mounting brackets at a desired spacing. Floor and top panels are inserted between the end panels to space the end panels on the rail member to define a compartment. Connection brackets are used to secure the spacing floor and top panels to the end panels. The connection brackets are designed to quickly and efficiently lock together the component parts of the cabinets. The brackets are designed so that they are not secured by fasteners that screw directly into the panels. The brackets provide a strong and reliable interconnection of parts.

23 Claims, 10 Drawing Sheets

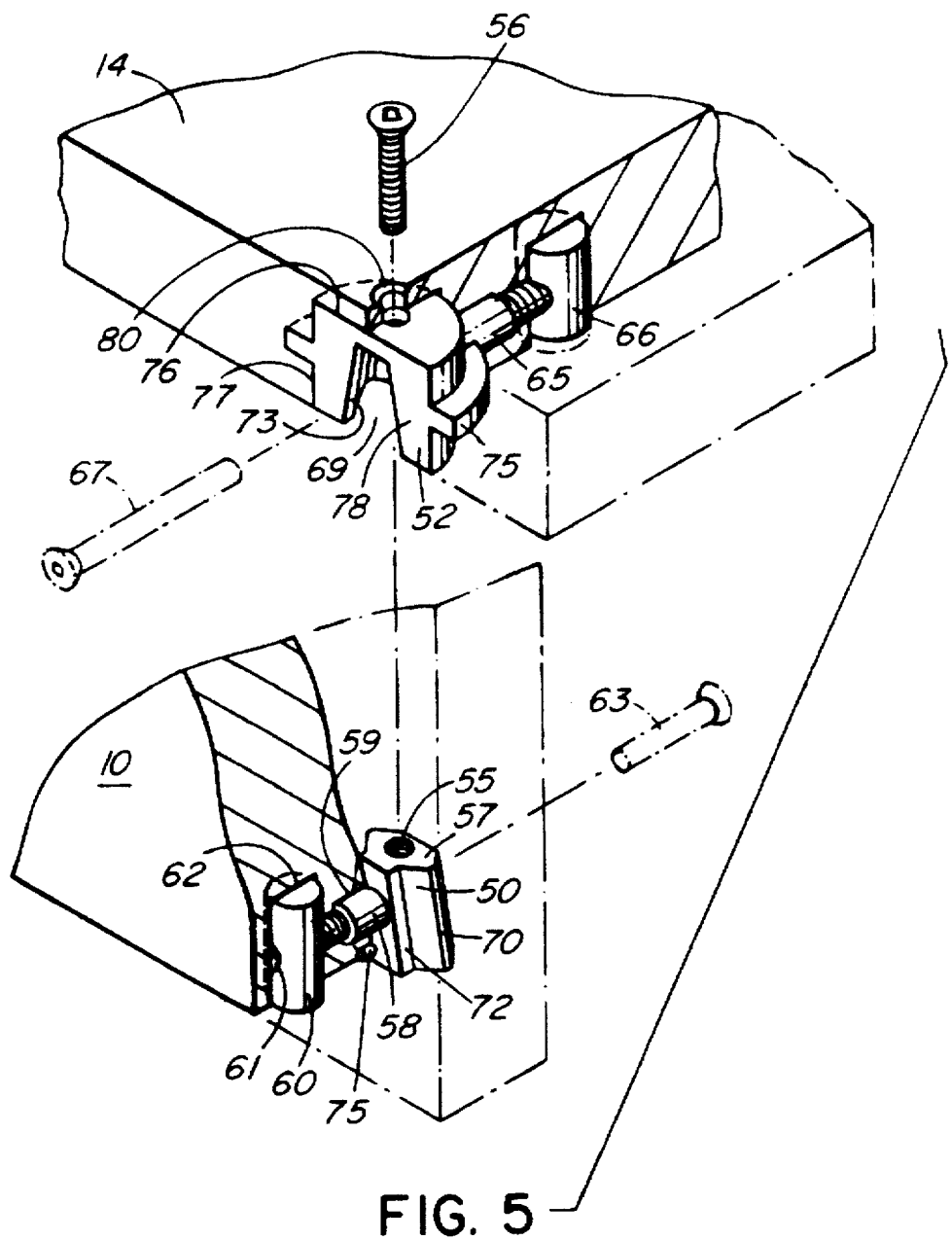
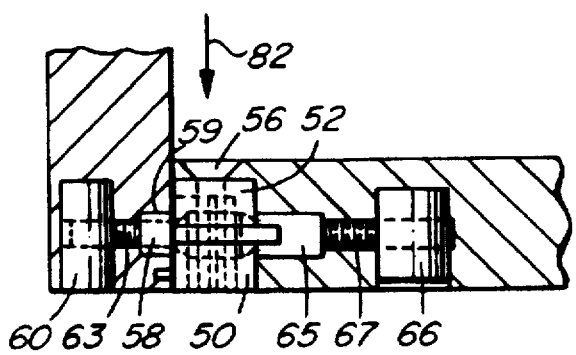
FIG. 5
FIG. 6

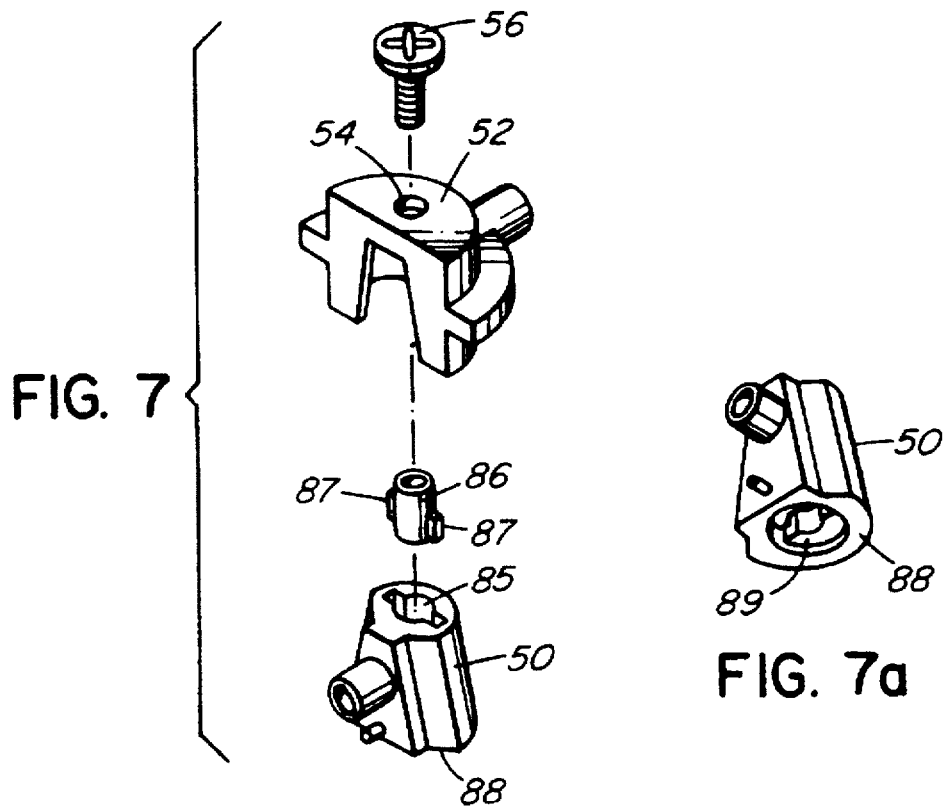
FIG. 7
FIG. 7a
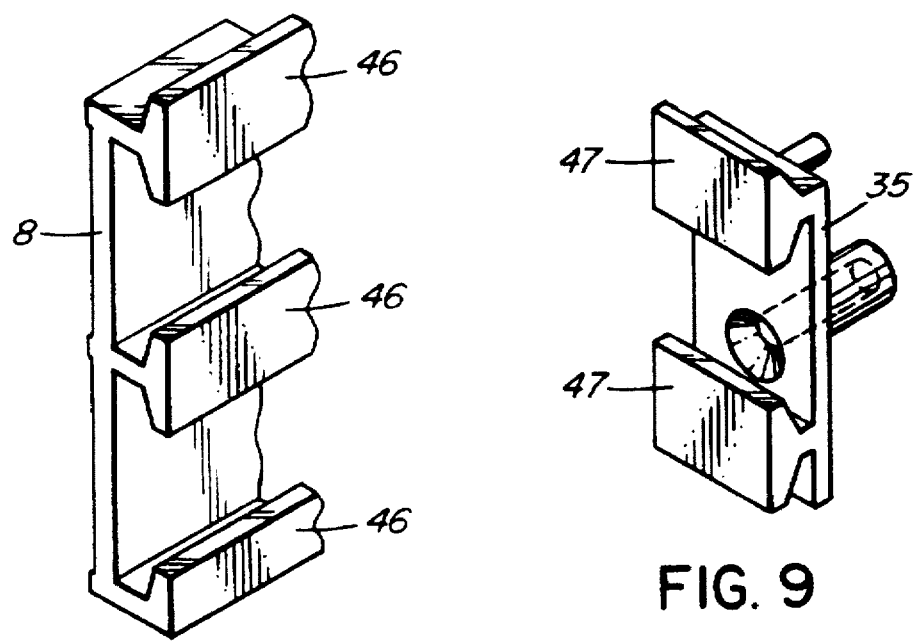
FIG. 8
FIG. 9

5,718,493

CABINET CONSTRUCTION SYSTEM

FIELD OF THE INVENTION

This invention relates to a system for cabinet construction and, more particularly, to system for construction of ready-to-install cabinets intended for use in institutional settings such as hospitals, schools and laboratories.

BACKGROUND OF THE INVENTION

Cabinets for use in institutional settings must be of sturdy construction to withstand normal day to day use. Custom fabrication of the cabinets is often preferred to ensure good quality and to suit the requirements of the eventual users. Custom fabrication also ensures the best use of the space available. The cabinets are constructed at the factory by a cabinet maker or assembled on-site by a finish carpenter. This involves using skilled workmen using costly tools who must cut and fit pieces from scratch which adds considerably to the cost of the resulting cabinets.

A recent trend to offset the cost of custom cabinets has been the use of ready-to-assemble cabinets which can be assembled quickly on site by semi-skilled workmen. Often, the cabinets are modular and can be assembled to fit into the available space.

Examples of prior art furniture construction systems and connectors are disclosed in the following patents:

U.S. Pat. No. 3,784,273 to Nikolai
U.S. Pat. No. 4,040,151 to Brimm
U.S. Pat. No. 4,236,848 to Rock et al.
U.S. Pat. No. 4,292,003 to Pond
U.S. Pat. No. 4,634,309 to Dewey
U.S. Pat. No. 4,685,848 to Langer
U.S. Pat. No. 4,869,564 to Lechman
U.S. Pat. No. 4,944,627 to Durney
U.S. Pat. No. 4,957,386 to Harley et al.

A problem with such ready-to-assemble furniture is that the component parts are often connected together by connectors that do not provide a sturdy or reliable join of parts. Hither the connector is not reliable or the connector joins two parts in such a way the the parts tend to fail in the region of the connector. Often this is due to connectors that are secured to panels by threaded fasteners engaged directly into the panel. This problem is particularly prevalent in modular cabinets constructed from particle board. Therefore, current modular cabinets tends to loosen or come apart after extended use which is unacceptable particularly in an institutional setting.

As well, a lot of ready-to-assemble furniture or cabinets do not have a high quality, factory assembled appearance when assembled.

A further disadvantage is that ready-to-assemble furniture is often difficult to assemble in that component parts must be erected into sub-assemblies that must be flipped and re-oriented in order to access various connectors. This manipulation of sub-assemblies can be awkward and tiring and can lead to damage of finished surfaces when such surface must be placed face down during a construction step.

SUMMARY OF THE INVENTION

The cabinet construction system of the present invention overcomes the foregoing problems and provides a modular cabinet system that is easy to install and assemble. The system is sturdy and durable with an attractive appearance.

Accordingly, the present invention provides a cabinet construction system comprising:

a rail member mountable to a fixed support surface;

end panels having end edges and sides, the edges of the panels having rail mounting means for mounting each end panel to the rail member at a desired spacing;

spacing means insertable between the end panels to space the end panels on the rail member to define a compartment; and releasably securable connector means to secure the spacing means to the end panels.

Once the rail member is fixed in place, end panels can be quickly suspended from the rail member to begin construction. Top and floor panel members are then secured into place between end panels. Unlike prior art systems, the present construction system does not require manipulating partially constructed sub-assemblies.

The connection system between component panels does not rely on fasteners that are threaded directly into component panels which adds significantly to strength and durability of the present system.

BRIEF DESCRIPTION OF THE DRAWINGS

Aspects of the present invention are illustrated, merely by way of example, in the accompanying drawings in which:

FIG. 5 is a perspective view with broken away sections showing the connection between a vertical end panel and a horizontal spacing panel;

FIG. 6 is a section view of an assembled joint between an end panel and a spacing panel;

FIG. 7 is an exploded view of an alternative connector for use between an end panel and a spacing panel that uses a cammed surface;

FIG. 7a is a detail view of the cammed surface of the connector of FIG. 7;

FIGS. 8 and 9 are perspective views of an alternative rail member and associated bracket for mounting an end panel;

DESCRIPTION OF THE PREFERRED EMBODIMENTS

Figure 1:
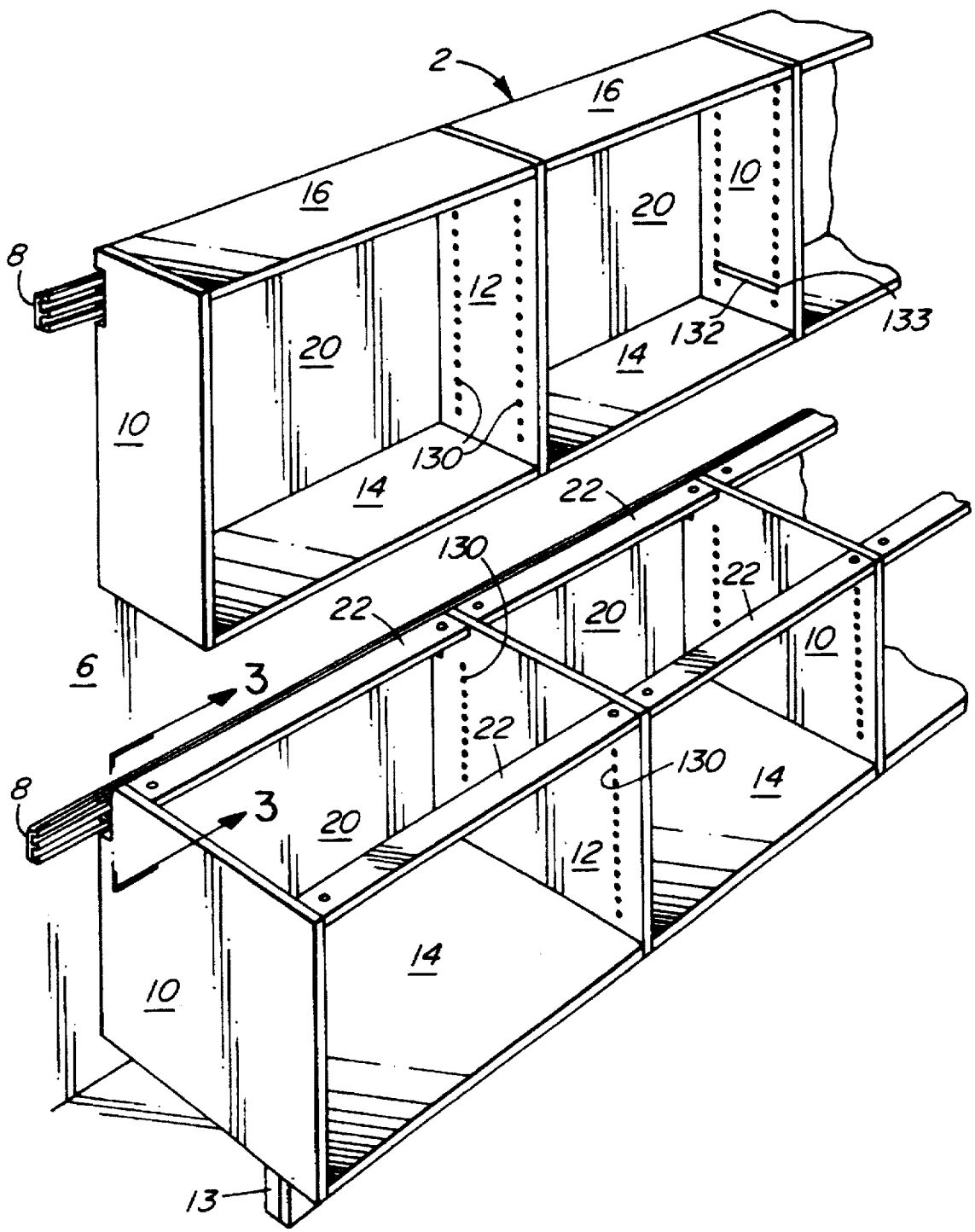
FIG. 1 is a perspective view of a pair of cabinet systems according to the present invention.

Referring to FIG. 1 of the drawings, the numerals 2 and 4 indicate generally cabinet systems mounted to a fixed support surface such as wall 6 and constructed according to embodiments of the present invention. Cabinet system 2 is an upper shelving unit and cabinet system 4 is a lower unit intended to support a counter top (not shown).

Figure 2:
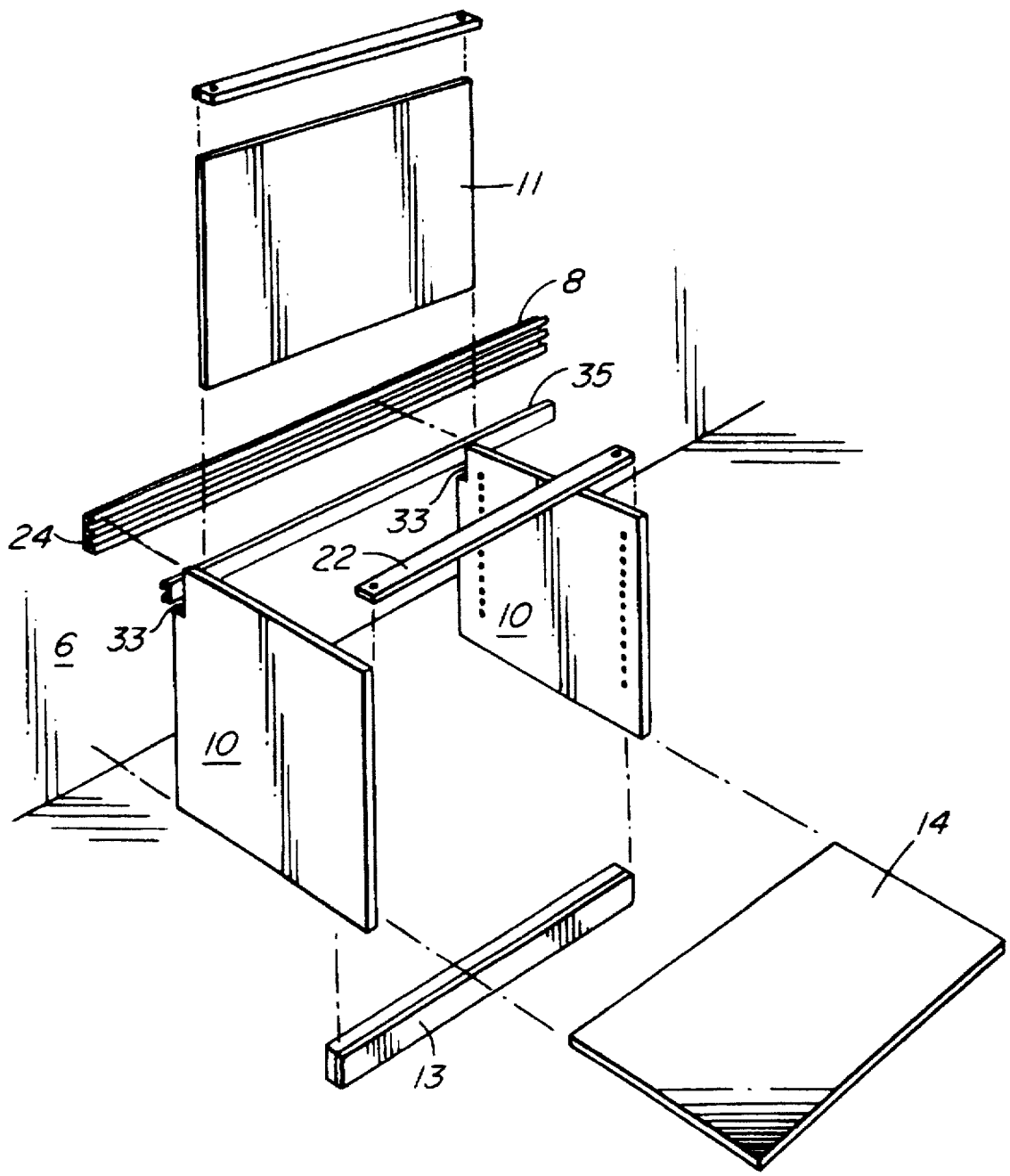
FIG. 2 is an exploded view showing the various components of one of the cabinet constructions shown in FIG. 1.

Both systems are constructed from a similar framework which involves an elongate rail member 8 attached to wall 6 from which are suspended a pair of spaced end panels 10 and intermediate dividing panels 12. Spacing means in the form of floor panels 14 and top panels 16 are releasably secured between adjacent end or dividing panels by connector means. Floor and top panels 14 and 16, respectively, space the end or dividing panels on the rail member to define compartments 20 as shown in upper cabinet system 2. Alternatively, as shown in lower cabinet system 4, the top panels 16 can be replaced by elongate bracing members 22 to support a counter top surface. FIG. 2 shows an exploded view of a simple, single compartment cabinet system 4 showing the various components parts for a lower cabinet system 4. Note that a rear panel 11 can be inserted between end panels 10 adjacent wall 6 to define a rear wall for compartment 20 or wall 6 can act as the rear wall. In both FIGS. 1 and 2, the lower cabinet system 4 is supported by rail member 8 a distance off the ground, and a kickboard 13 is provided to seal the area under the cabinets.

Figure 3:
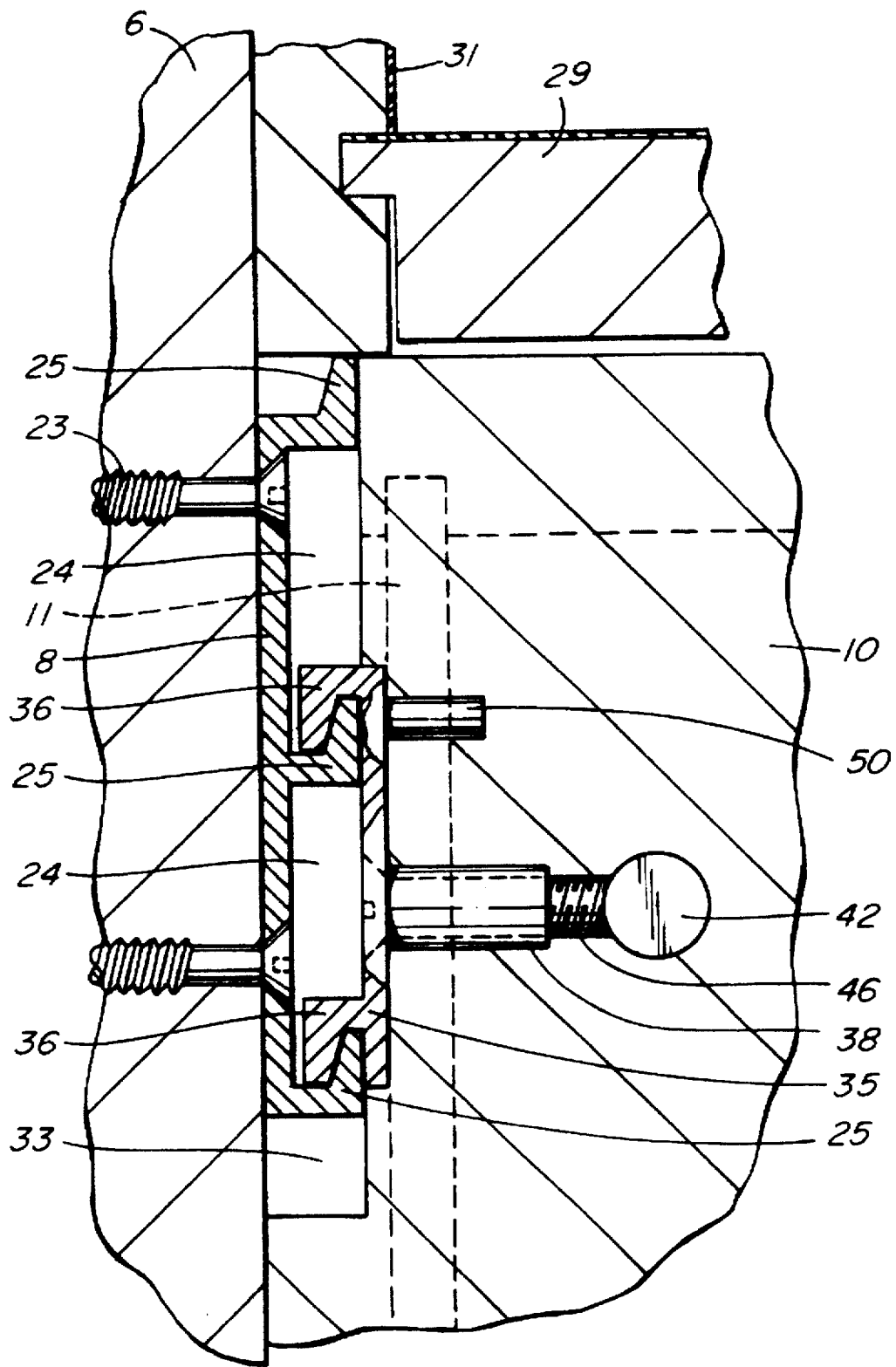
FIG. 3 is a section view taken along line 3—3 of FIG. 1 showing the connection between the rail member and the end panels.

FIG. 3 is a section view taken along line 3—3 of FIG. 1 showing details of the manner in which an end panel 10 is mounted to a rail member 8. Rail member 8 comprises an elongate moulding that is formed with at least one generally horizontally extending slot 24. End panels 10 are provided with rail mounting means to allow the end panels to be secured in slot 24. Rail member 8 is preferably formed with a plurality of slots 24 defined by a series of flanges 25 extending outwardly and upwardly from the rail member. Rail member 8 is secured to wall 6 by threaded fasteners 23 at a preselected height above the floor and once the rail member has been attached to wall 6, construction of the rest of the cabinet system of the present invention proceeds by mounting end panels 10 to the rail member at a desired spacing. FIG. 3 also shows how a counter top surface 29 and a vertical finishing surface 31 are mounted atop the underlying framework of the cabinet system shown in FIG. 1 to cover rail member 8.

Figure 4:
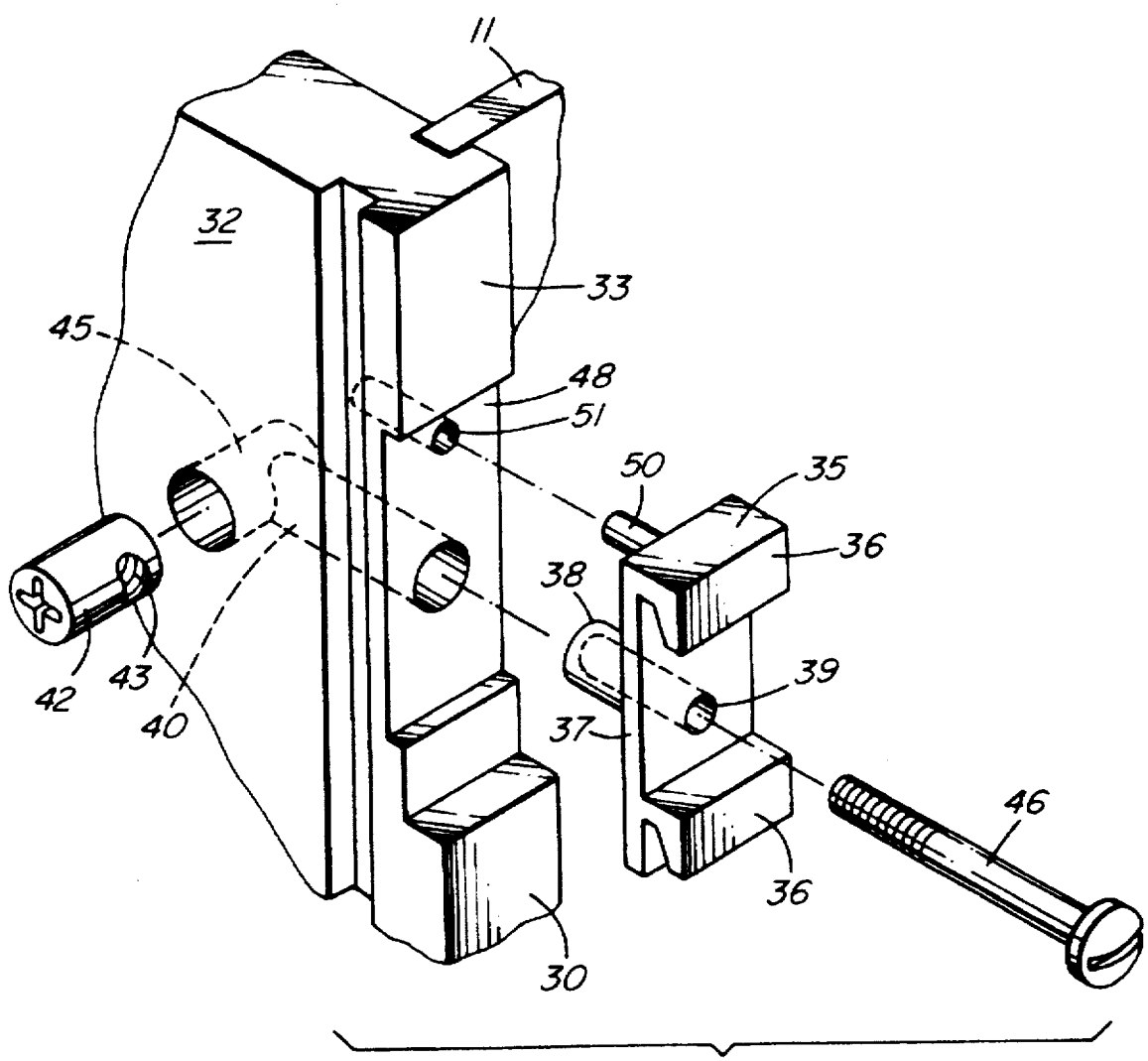
FIG. 4 is a exploded view showing the manner in which the mounting bracket for attaching an end panel to the rail member is secured to the end panel.

End panels 10 are of identical construction and therefore interchangeable and preferably they are made of standard plywood or particle board for strength and economy of manufacture. As best shown in FIG. 4, each end panel 10 has an end edge 30 and sides 32. To accommodate rear panels 11, slots 34 adjacent end edge 30 are formed to slidably receive rear panels 11. End edge 30 has a cutaway section 33 adjacent the top, rear corner to accommodate rail member 8 so that the rest of the panel and edge will lie flush against support wall 6. Cutaway section 33 also provides the site for attachment of the rail mounting means to the end panel. The rail mounting means comprises a bracket 35 formed with downwardly extending flanges 36 adapted to be received in the slots 24 of rail member 8 (see FIG. 3). Rail mounting brackets 35 comprises a main body 37 formed with a bore 38 having a passage 39 therethrough. End edge 30 of end panel 10 is formed with a first cavity 40 to receive the bore.

An anchor post 42 is also provided and formed with a transverse threaded aperture 43. Side 32 of end panel 10 is formed with a second cavity 45 that intersects the first cavity 40 and receives anchor post 42. To secure bracket 35 to end panel 10, bore 38 is inserted within cavity 40 and a threaded fastener 46 is inserted through bore 38 to engage in threaded aperture 43 of anchor post 42. Main body 37 of bracket 35 is also received in a rectangular cavity 48 formed in the end panel. Preferably, an alignment pin 50 is formed on bracket 35 and a corresponding hole 51 in end panel 10 to assist in positioning of the bracket during attachment to the end panel.

The foregoing arrangement provides a system for mounting a bracket to an end panel that does not involve engagement of a threaded fastener directly into the wooden end panel. This greatly enhances the durability of the connection as there is not the problem of threaded fasteners pulling free or working loose from direct engagement within a wooden panel. The various connecting members of the present invention rely on the same general system of intersecting cavities that receive anchor posts and threaded fasteners which ensures a reliable and durable mounting of the connecting members to a wooden panel.

FIGS. 8 and 9 show an alternative rail member 8 and rail mounting bracket 35 formed with longer terminal flanges that lock together. This arrangement ensures a positive interlocking of the rail member and the rail mounting bracket and is best suited for use when constructing cabinets in areas such as earthquake zones.

Dividing panels 12 are identical to end panels 10 and also include a rail mounting bracket 35 to permit mounting to the rail member at desired locations intermediate the end panels to define additional compartments between the end panels.

Referring back to FIG. 2, in some circumstances, it may be desirable to include a second rail member 8 to support the end panels and any dividing panels in which case, a second rail mounting bracket would have to be attached to each panel in the same manner as the first bracket.

Once the end panels 10 and any dividing panels 12 are suspended from rail member 8, spacing means in the form of a floor panel 14 or top panel 16 are insertable between adjacent rail mounted panels to define a floor or top to a compartment. Instead of a full panel, the spacing means can also be in the form of an elongate bracing member 22 insertable between adjacent rail mounted panels.

Releasably securable connecting means are used to join a floor or top panel to a rail mounted panel. FIGS. 5 and 6 show one embodiment of connecting means comprising a male portion 50 mounted to an end panel 10 and a female portion 52 mounted in a floor panel 14. Female portion 52 is adapted to slidably receive the male portion to secure the end panel 10 and the floor panel 14 at substantially right angles to each other. In addition, female portion 52 and male portion 50 include alignable passages 54 and 55 to receive a threaded fastener 56 to lock the two portions together.

Male portion 50 comprises a main body formed with a rearwardly extending bore 58. End panel 10 is formed with a corresponding first cavity 59 to receive bore 58. An anchor post 60 formed with a transverse threaded aperture 61 is received in a second cavity 62 in the end panel to receive the anchor post. The first and second cavities extend at right angles to each other and intersect. A threaded fastener 63 is insertable through bore 58 to engage in threaded aperture 61 of anchor post 60 to secure the male portion 50 to the end panel.

The female portion 52 is also formed with a rearwardly extending bore 65 and is attached to floor panel 14 in an identical manner as male portion 50 using an anchor post 66 and a threaded fastener 67 received in appropriate cavities formed in the floor panel.

The main body of male portion 50 comprises a generally frusto-conical member 70 that expands from a flat upper surface 57 formed with passage 55 to a broad base. Female portion 52 comprises a generally semi-circular main body having a flat top surface 76, a semi-circular side wall 77, a vertical end wall 78 and an open bottom to define a central cavity 69 to receive the frusto-conical member. Top surface 76 is formed with passage 54 therethrough. Frusto-conical member 70 is formed with a shoulder 72 that is received in a corresponding opening 73 in end wall 78 of female portion 52.

Male portion 50 is formed with an alignment pin 75 that is received in a hole in end panel 10. Female portion 52 is inserted within a cavity that is predrilled into the side edge of a floor panel 14. Female portion 52 is formed with a semi-circular flange 75 that extends outwardly from semi-circular wall 77. Flange 75 fits into a corresponding slot in the floor panel cavity to ensure correct alignment of the female portion.

FIG. 6 shows the releasably connectable securing portions of FIG. 5 in their joined state. A passage 80 is formed in the floor panel to permit fastener 56 access to passage 54 in the female portion for tightening into threaded aperture 55 in male portion 50. Fastener 56 can be concealed with a suitable plastic cover. Female cavity 69 is slid downwardly onto male portion 50 in the direction of arrow 82 to join together the two parts. When assembled the parts of the connection are hidden from view on the underside of the floor panel and the end panel. The same connection system as illustrated in FIGS. 5 and 6 can be used to join end panels 10 to floor or top panels 14 and 16, respectively, or bracing members 22. Generally, a pair of spaced connectors will be used at each right angled join between panels.

FIGS. 7 and 7a are views of an alternative connector system that relies on a cam surface to lock together male and female portions 50 and 52, respectively, but is otherwise identical to the connector system shown in FIGS. 5 and 6. Male portion 50 is formed with a cental passage 85 extending therethrough from top surface 57 to lower surface 88 shaped to accept post member 86 formed with radially extending flanges 87. As best shown in FIG. 7a, lower surface 88 of male portion 50 is formed with a cam surfaces 89 that are engageable by flanges 87. Fastener 56 extends through aperture 54 in female portion 52 to engage with post member 86 in passage 85. Rotating fastener 56 causes flanges 87 to move along cam surfaces 89 to lock together the male and female portions.

FIGS. 10–15 illustrate further examples of connectors for joining together vertically oriented rail mounted panels and horizontally oriented floor or top panels or bracing members.

Figure 10:
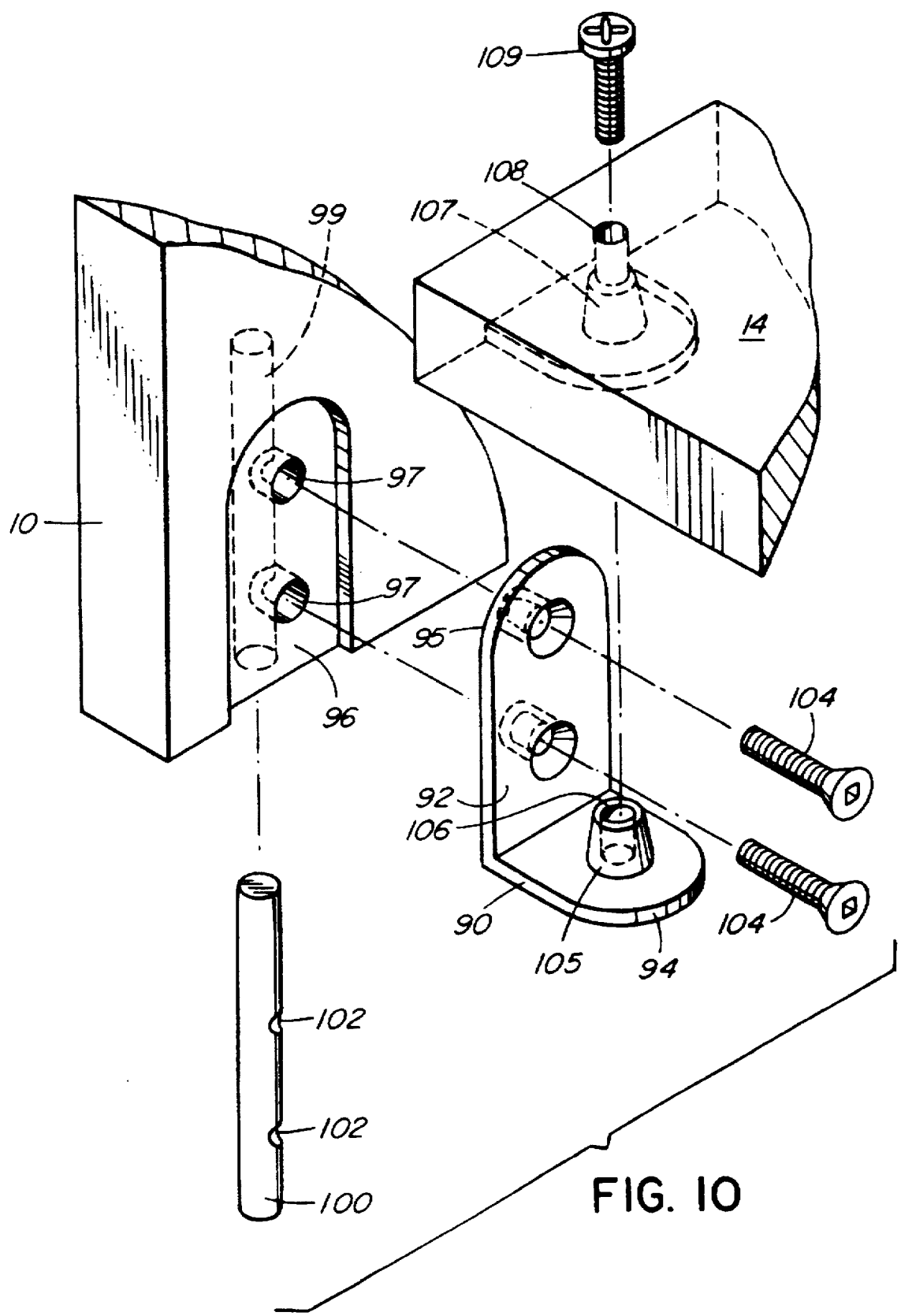
FIG. 10 is an exploded perspective view of an alternative connecting bracket system for joining an end panel to a spacing panel.
Figure 11:
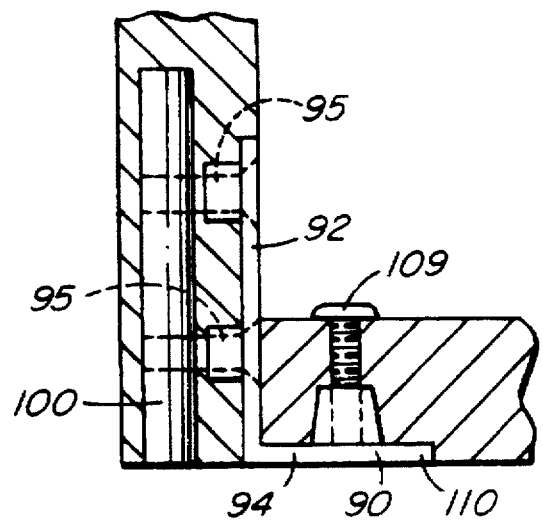
FIG. 11 is a section view showing the assembled connection system of FIG. 10.

In the embodiment of FIGS. 10 and 11, the connector is a one piece member comprising a right angled bracket 90 having a vertically extending portion 92 and an outwardly extending horizontal portion 94. Vertical portion 92 is formed with a pair of bores 95 that extend rearwardly. Vertical portion 92 is received in an inset region 96 adjacent the lower edge of an end panel 10. The inset region includes a pair of horizontal cavities 97 that accept bores 95. A vertical cavity 99 formed in the lower edge of end panel 10 intersects cavities 97. An elongate anchor post 100 with transverse threaded apertures 102 is insertable within cavity 99. Threaded fasteners 104 are insertable through bores 95 to engage in apertures 102 to secure right angled bracket 90 to the end panel.

Horizontal portion 94 of bracket 90 is formed with a an upstanding frusto-conical member 105 having a threaded opening 106. Member 105 is received in a correspondingly shaped cavity 107 formed in the underside of a floor panel 14. A passage 108 extends from the upper surface of the floor panel to communicate with cavity 107. A threaded fastener 109 is insertable through passage 108 to engage in opening 106 of frusto-conical member 105 to lock the floor panel 14 and the end panel 10 together.

FIG. 11 shows the connector of FIG. 10 in its joined state. Note that the underside of floor panel 10 is also formed with an inset region 110 to accept horizontal portion 94 of bracket 90.

Figure 12:
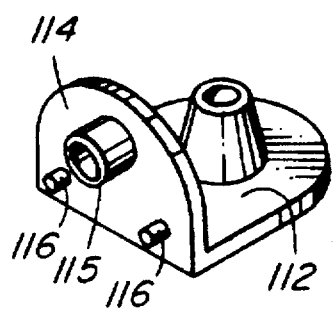
FIG. 12 shows a variation of the connecting bracket shown in FIG. 10.

FIG. 12 shows a similar one-piece bracket member 112 to that illustrates in FIGS. 10 and 11 except that the current bracket is formed with a shorter vertical portion 114 having a single bore 115 and alignment pins 116.

Figure 13:
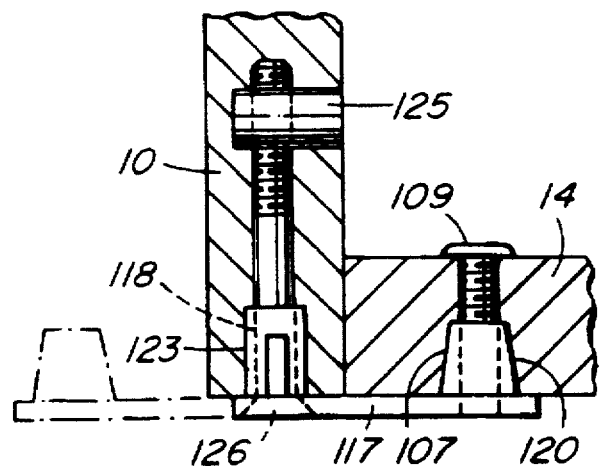
FIG. 13 is a section view showing another connecting bracket for joining an end panel and a spacing panel.
Figure 14:
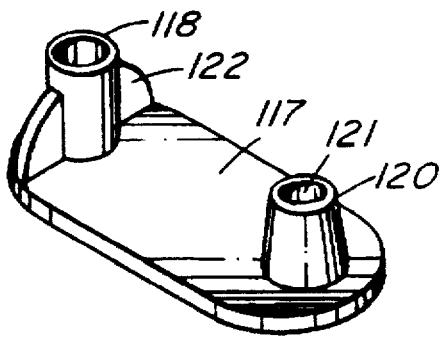
FIG. 14 is a perspective view of the connecting bracket of FIG. 13.
Figure 15:
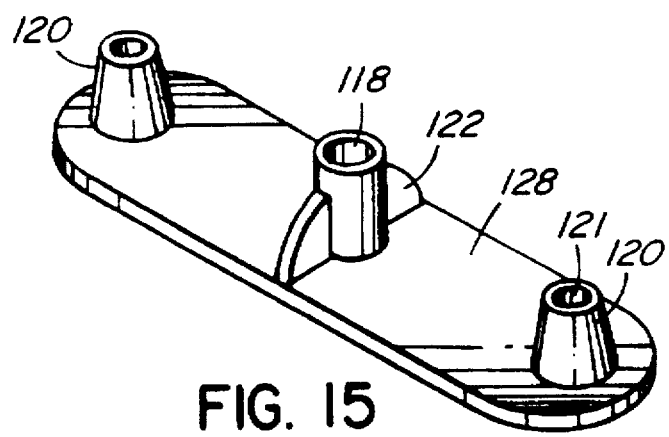
FIG. 15 is a perspective view of a double connecting bracket shown by dashed lines in FIG. 13.

FIGS. 14 and 15 illustrate additional connectors comprising a single horizontally extending bracket 117 formed with an upstanding bore 118 and an upstanding frusto-conical member 120 with a central aperture 121. Upstanding bore 118 is formed with semi-circular aligning flanges 122. As best shown in FIG. 13, bore 118 of bracket 117 is inserted into an aperture 123 formed in the lower edge of an end panel 10. An anchor post 125 with a transverse threaded aperture is inserted into a hole formed in the side of end panel 10 that intersects aperture 123. A threaded fastener 126 extends through bore 118 to engage in the transverse threaded aperture of the anchor post 125 to secure bracket 117 to the lower edge of panel 10. A floor panel 14 is secured to the frusto-conical member of the bracket in the same manner as the embodiment of FIGS. 10 and 11.

FIG. 15 illustrates a double horizontal bracket member 128 with upstanding frusto-conical members 120 formed at either end of the bracket on opposite sides of a central upstanding bore 118. As best shown by dashed lines 130 in FIG. 13, bracket member 128 is designed to extend across a lower edge of an end panel 10 to engage with floor panels 14 on either side of the end panel.

Figure 14A:
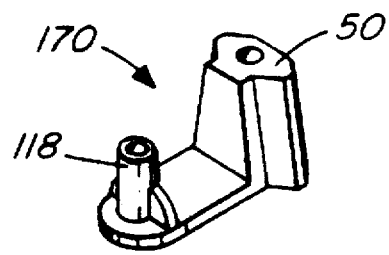
FIG. 14a is a perspective view of a further connecting bracket.

FIG. 14a shows a further connector 170 that combines the horizontally extending bracket 117 and the upstanding bore 118 of the connector of FIG. 14 and the male portion 50 of the connector of FIG. 5. In this case, bracket 117 is dimensioned to extend across the edge of a panel so that male portion 52 is positioned adjacent the inside surface of the panel when bore 118 is inserted into its cavity in the edge of the panel. Connector 170 would be joined to a female portion 52 identical to that shown in FIG. 6. In a similar arrangement to that shown in FIG. 15, a double connector can be formed on an elongate bracket with a pair of male portions 50 formed on either side of a central bore 118 so that the connector will extend across the width of a panel to be joined to two female portions 52 on either side of the panel.

It will be readily apparent from the foregoing description that a cabinet system of almost any desired length can be constructed using the components of the present invention by varying the length of the rail member 8 and suspending end panels and dividing panels from the rail member. Spacing panels in the form of floor panels and top panels are added to define compartments 20 in the cabinet system. Each compartment 20 of the cabinet system may be fitted with drawers 140 or doors 142 shown in FIG. 16 and FIG. 17, respectively.

With respect to installation of drawers 140, it will be noted from FIGS. 1 and 2 that the vertical end edges of rail supported end panels 10 and dividing panels 12 are formed with a vertical row of holes 130 adjacent each of the edges. A load-carrying inner assembly 132 is mountable within a compartment 20 by hanger means 133 mountable to a selected hole of a vertical row for securing a part of the inner assembly to a panel. Hangar means 133 can comprise pins to support a shelf or threaded fasteners to support a load-carrying assembly 132 such as conventional horizontal telescoping rails to accommodate sliding drawers.

Figure 16:
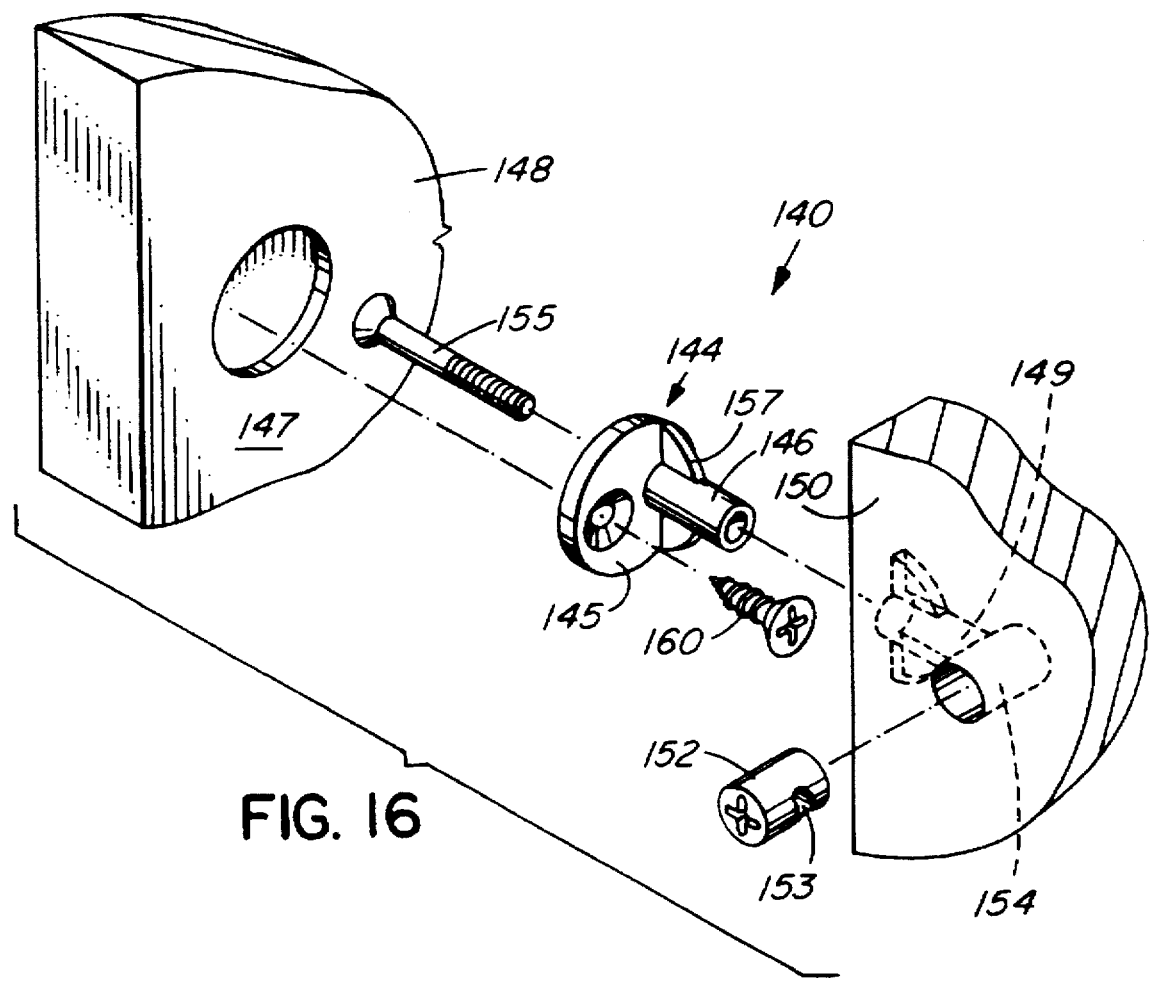
FIG. 16 is an exploded perspective view of a connecting system for joining drawer panels.

A drawer 140 for use with the cabinet system of the present invention is preferably formed from a plurality of panels that are connected together using drawer connecting means 144 shown in FIG. 16. Draw connecting means comprise a generally circular bracket 145 securable to the side 147 of a first panel 148 to be joined. Bracket 145 has a bore 146 extending from one side of the bracket to be received in a first opening 149 formed in an edge of a second panel 150 to be joined. An anchor post 152 formed with a transverse threaded aperture 153 is received in a second opening 154 formed in a side of the second panel 150. Second opening 154 intersects the first opening 149 and a threaded fastener is insertable through bore 146 to engage in threaded aperture 153 of anchor post 152 to secure the first panel to the second panel at right angles to each other. Bracket 145 is provided with an alignment flange 157 to ensure the that the bracket will remain in position during installation. Bracket 145 is preferably secured to first panel 148 by a screw 160 that is received in a hole 161 extending through the bracket adjacent bore 146. In addition, a circular inset region 162 is formed on first panel 148 to ensure that bracket 145 is flush with the inside surface of the first panel when installed.

Figure 17:
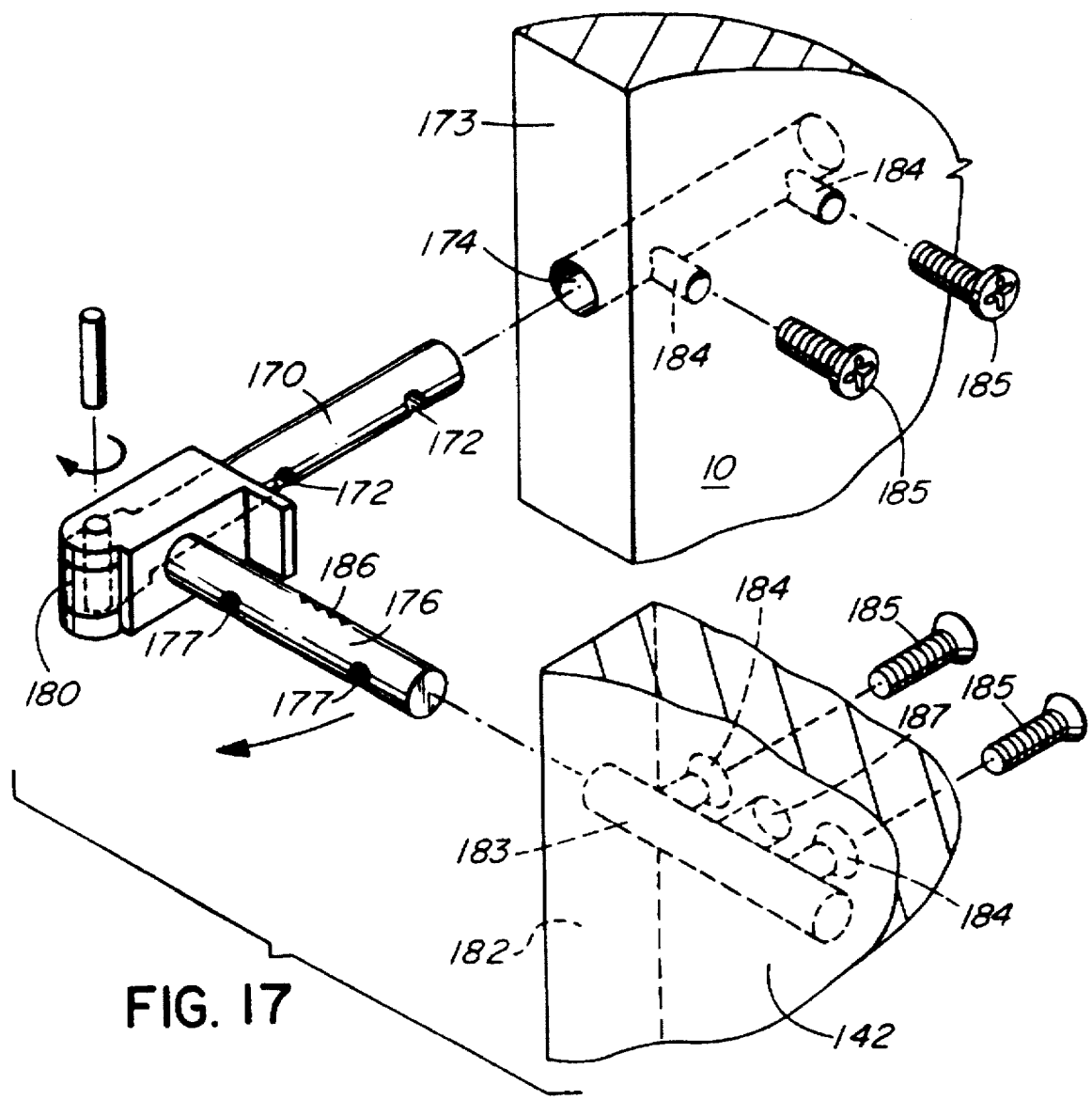
FIG. 17 is an exploded perspective view of a hinge system for connecting doors.

FIG. 17 illustrates the manner in which a door 142 can be mounted to an end panel for pivoting movement. Door 142 is hung on an end panel 10 by hinge means comprising a first post member 170 having transverse threaded holes 172. End panel 10 has end edge 173 formed with a cavity 174 to receive first post member 170. A second post member 176 having transverse threaded holes 177 is hingedly attached to the first post member at 180. Door 142 has an end edge 182 formed with a cavity 183 to receive the second post member. Threaded fasteners 185 extend into the door and the end panel through holes 184 to enter the transverse threaded holes of the post members to secure the hinge means to the door and the end panel.

It is readily apparent that first post member 170 can hingedly support a pair of second post members 176 to support a pair of doors 142 on opposite sides of the end panel 10.

Second post member 176 is preferably provided with means to adjust the position of the door associated with the second post means comprising a set of teeth 186 formed on the post member. An access hole 187 is formed on the inner surface of door 142 between holes 184. Post member 176 is a tight fit within hole 183 and a screw driver is insertable within access hole 187 to engage teeth 186 to slide post 186 within hole 187 to properly adjust the position of the door on the hinge assembly. After adjustment, fasteners 185 are then tightened into place to secure the door in the desired position on the hinge assembly. A plastic cover conceals access hole 187.

Although the present invention has been described in some detail by way of example for purposes of clarity and understanding, it will be apparent that certain changes and modifications may be practised within the scope of the appended claims.

I claim:

1. A cabinet construction system comprising:
   a rail member mountable to a fixed support surface, the rail member being formed with at least one generally horizontally extending slot;
   end panels having end edges and sides;
   rail mounting brackets for mounting each end panel to the rail member at a desired spacing, each bracket having a main body formed with a flange adapted to be received in the slot of the rail member, and each bracket being attached to each end panel end edge by a bore extending from the bracket and received in a first cavity in the end edge, and anchor post formed with a transverse threaded aperture, a second cavity formed in one of the sides of the end panel that intersects the first cavity to receive the anchor post, and a threaded fastener inserted through the bore to engage in the threaded aperture of the anchor post to secure the main body to the end panel;
   spacing means inserted between the end panels to space the end panels on the rail member to define a compartment; and
   releasably securable connector means to secure the spacing means to the end panels.

2. A cabinet construction system as claimed in claim 1 including a second rail member to support the end panels.

3. A cabinet construction system as claimed in claim 1 including dividing panels mountable to the rail member, the dividing panels being identical to the end panels and mountable to the rail member at a desired location intermediate the end panels to define additional compartments between the end panels.

4. A cabinet construction system as claimed in claim 1 in which the spacing means comprises a spacing panel insertable between adjacent end panels to define a floor or top to the compartment.

5. A cabinet construction system as claimed in claim 1 in which the spacing means comprises at least one elongate bracing member insertable between adjacent end panels.

6. A cabinet construction system as claimed in claim 1 in which each of the end panels has front and rear edges and a vertical row of holes adjacent each of the edges, a load-carrying inner assembly mountable within the compartment, and hanger means mountable to a selected hole of a vertical row for securing a part of the inner assembly to an end panel.

7. A cabinet construction as claimed in claim 6 including a drawer structure to be received on the load-carrying inner assembly.

8. A cabinet construction as claimed in claim 7 in which the drawer structure is formed from a plurality of panels having panel sides and panel edges that are releasably secured together by drawer connecting means comprising:
   a bracket securable to the side of a first panel to be joined, the bracket having a bore extending from the bracket to be received in a first opening formed in an edge of a second panel to be joined;
   an anchor post formed with a transverse threaded aperture to be received in a second opening formed in a side of the second panel that intersects the first opening; and
   a threaded fastener extending through the bore to engage in the threaded aperture of the anchor post to secure the first panel to the second panel at right angles to each other.

9. A cabinet construction system as claimed in claim 1 in which the releasably securable connecting means comprises:

a male portion mounted to each of the end panels;

a female portion formed in the spacing means and adapted to slidably receive the male portion to secure the end panel and the spacing means at substantially right angles to each other;

passages through the male portion and the female portion that receive fastening means to lock the two portions together.

10. A cabinet construction system as claimed in 9 in which the male portion comprises:

a main body formed with a bore, the end panel having a first cavity to receive the bore;

an anchor post formed with a transverse threaded aperture, the end panel having a second cavity to receive the anchor post, the second cavity intersecting the first cavity; and a threaded fastener extending through the bore to engage in the threaded aperture of the anchor post to secure the main body to the end panel.

11. A cabinet construction system as claimed in 9 in which the female portion comprises:

a main body formed with a bore, the spacing means having a first cavity to receive the main body and the bore;

an anchor post formed with a transverse threaded aperture, the spacing means having a second cavity to receive the threaded post, the second cavity intersecting the first cavity; and a threaded fastener extending through the bore to engage in the threaded aperture of the anchor post to secure the main body to the spacing means within the first cavity.

12. A cabinet construction system as claimed in claim 9 in which the male portion comprises a generally frusto-conical member and the female portion comprises a correspondingly shaped cavity.

13. A cabinet construction system as claimed in claim 9 in which the male portion includes a cam surface and the fastening means comprises an elongate post with radially extending extensions adapted to engage the cam surface to lock together the male and female portions.

14. A cabinet construction system as claimed in claim 9 in which the releasably securable connecting means includes a pair of male portions formed at opposite ends of an elongate bracket, the bracket being adapted to extend across an edge of a dividing panel to engage female portions of the spacing means on either side of the dividing panel.

15. A cabinet construction system as claimed in claim 1 including a door hung on one of the end panels by hinge means, the hinge means comprising a first post member having a transverse threaded hole, the end panel having an end edge formed with a cavity to receive the first post member, and a second post member having a transverse threaded hole, the second post member being hingedly attached to the first post member, the door having an end edge formed with a cavity to receive the second post member, and threaded fasteners extending into the door and the end panel to enter the transverse threaded holes.

16. A cabinet construction system as claimed in claim 15 including means to adjust the position of the door associated with the second post member.

17. A cabinet construction system comprising:

a rail member mountable to a fixed support surface;

end panels having front and rear end edges and sides, the rear end edges of the panels having rail mounting means for mounting each end panel to the rail member at a desired spacing;

spacing means insertable between the end panels to space the end panels on the rail member to define at least one compartment;

releasably securable connector means to secure the spacing means to the end panels;

a load-carrying inner assembly mountable within the at least one compartment, and hanger means mountable to the panels are securing a part of the inner assembly to an end panel;

a drawer structure to be received on the load-carrying inner assembly formed from a plurality of drawer panels having drawer panel sides and drawer panel edges that are releasably secured together by drawer connecting means comprising:

a bracket securable to the side of a first drawer panel to be joined, the bracket having a bore extending from the bracket to be received in a first opening formed in an edge of a second drawer panel to be joined;

an anchor post formed with a transverse threaded aperture to be received in a second opening formed in a side of the second drawer panel that intersects the first opening; and a threaded fastener extending through the bore to engage in the threaded aperture of the anchor post to secure the first drawer panel to the second drawer panel at right angles to each other.

18. A cabinet construction system comprising:

a rail member mountable to a fixed support surface;

end panels having end edges and sides, the edges of the panels having rail mounting means for mounting each end panel to the rail member at a desired spacing;

spacing means insertable between the end panels to space the end panels on the rail member to define a compartment;

releasably securable connector means to secure the spacing means to the end panels comprising:

a male portion mounted to each of the end panels having a main body formed with a bore, the end panel having a first cavity to receive the bore;

an anchor post formed with a transverse threaded aperture, the end panel having a second cavity to receive the anchor post, the second cavity intersecting the first cavity; and a threaded fastener insertable through the bore to engage in the threaded aperture of the anchor post to secure the main body to the end panel;

a female portion formed in the spacing means and adapted to slidably receive the male portion to secure the end panel and the spacing means at substantially right angles to each other; and passages through the male portion and the female portion that are alignable to receive fastening means to lock the two portions together.

19. A cabinet construction system as claimed in 18 in which the female portion comprises:

a main body formed with a bore, the spacing means having a first cavity to receive the main body and the bore;

an anchor post formed with a transverse threaded aperture, the spacing means having a second cavity to receive the threaded post, the second cavity intersecting the first cavity; and a threaded fastener extending through the bore to engage in the threaded aperture of the anchor post to secure the main body to the spacing means within the first cavity.

20. A cabinet construction system comprising:

a rail member mountable to a fixed support surface;

end panels having end edges and sides, the edges of the panels having rail mounting means for mounting each end panel to the rail member at a desired spacing;

spacing means insertable between the end panels to space the end panels on the rail member to define a compartment;

releasably securable connector means to secure the spacing means to the end panels, each connector means comprising:

a female portion mounted to the spacing means and having a main body formed with a bore, the spacing means having a first cavity to receive the main body and the bore;

an anchor post formed with a transverse threaded aperture, the spacing means having a second cavity to receive the threaded post, the second cavity intersecting the first cavity;

a threaded fastener extending through the bore to engage in the threaded aperture of the anchor post to secure the main body to the spacing means within the first cavity;

a male portion mounted to the panel adapted to be slidably received in the female portion to secure the end panel and the spacing means at substantially right angles to each other; and passages through the male portion and the female portion that are alignable to receive fastening means to lock the two portions together.

21. A cabinet construction system as claimed in 20 in which the male portion comprises:

a main body formed with a bore, the end panel having a first cavity to receive the bore;

an anchor post formed with a transverse threaded aperture, the end panel having a second cavity to receive the anchor post, the second cavity intersecting the first cavity; and a threaded fastener extending through the bore to engage in the threaded aperture of the anchor post to secure the main body to the end panel.

22. A cabinet construction system comprising:

a rail member mountable to a fixed support surface;

end panels having front and rear end edges and sides, the rear end edges of the panels having rail mounting means for mounting each end panel to the rail member at a desired spacing;

spacing means insertable between the end panels to space the end panels on the rail member to define at least one compartment;

releasably securable connector means to secure the spacing means to the end panels;

a door hangable on at least one of the end panels by hinge means comprising a first post member having a transverse threaded hole, the at least one end panel having an end edge formed with a cavity to receive the first post member, and a second post member having a transverse threaded hole, the second post member being hingedly attached to the first post member, the door having an end edge formed with a cavity to receive the second post member, and threaded fasteners extending into the door and the at least one end panel to enter the transverse threaded holes.

23. A cabinet construction system as claimed in claim 22 including means to adjust the position of the door associated with the second post member.

* * * * *